United States Patent
Eritate et al.

(10) Patent No.: US 8,042,634 B2
(45) Date of Patent: Oct. 25, 2011

(54) POWER OUTPUT APPARATUS, VEHICLE MOUNTING THE SAME, AND METHOD FOR CONTROLLING POWER OUTPUT APPARATUS

(75) Inventors: Kazunobu Eritate, Susono (JP); Tomokazu Yamauchi, Toyota (JP); Shoichi Sasaki, Mishima (JP); Yuki Tojima, Aichi-ken (JP); Takahiro Misu, Nagoya (JP); Masami Osawa, Nagoya (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 408 days.

(21) Appl. No.: 12/306,443

(22) PCT Filed: Jun. 21, 2007

(86) PCT No.: PCT/JP2007/062488
§ 371 (c)(1),
(2), (4) Date: Mar. 19, 2009

(87) PCT Pub. No.: WO2007/148749
PCT Pub. Date: Dec. 27, 2007

(65) Prior Publication Data
US 2009/0242287 A1    Oct. 1, 2009

(30) Foreign Application Priority Data
Jun. 23, 2006    (JP) .................................. 2006-173955

(51) Int. Cl.
B60K 6/50 (2007.10)
(52) U.S. Cl. ................................ 180/65.6; 475/5; 477/3
(58) Field of Classification Search .............. 180/65.22, 180/65.23, 65.235, 65.6, 65.7; 475/5; 477/2, 477/3
See application file for complete search history.

(56) References Cited

U.S. PATENT DOCUMENTS

| | | | |
|---|---|---|---|
| 6,328,670 B1 * | 12/2001 | Minowa et al. | 477/5 |
| 6,520,879 B2 * | 2/2003 | Kawabata et al. | 475/5 |
| 7,034,481 B2 * | 4/2006 | Imai | 318/376 |
| 2004/0251862 A1 | 12/2004 | Imai | |

FOREIGN PATENT DOCUMENTS

| | | |
|---|---|---|
| JP | 10-075501 | 3/1998 |
| JP | 11-332018 | 11/1999 |
| JP | 2002-135910 | 5/2002 |
| JP | 2003-531764 A | 10/2003 |
| JP | 2005-297590 | 10/2005 |
| JP | 2005-297786 | 10/2005 |

* cited by examiner

Primary Examiner — John Walters
(74) Attorney, Agent, or Firm — Kenyon & Kenyon LLP (57) ABSTRACT

The rotating shaft of the motor is connected to and disconnected from the first coupled rotating shaft, the crankshaft of the engine, and the drive shaft is connected to and disconnected from the second coupled rotating shaft and the third coupled rotating shaft. Thereby, the connection state when a power is output to the drive shaft can be increased and the power to the drive shaft can be output in a more efficient connection state in comparison with only connecting and disconnecting the rotating shaft of the motor to and from the first coupled rotating shaft and the crankshaft of the engine.

16 Claims, 5 Drawing Sheets

POWER OUTPUT APPARATUS, VEHICLE MOUNTING THE SAME, AND METHOD FOR CONTROLLING POWER OUTPUT APPARATUS

This is a 371 national phase application of PCT/JP2007/062488 filed 21 Jun. 2007, claiming priority to Japanese Patent Application No. JP 2006-173955 filed 23 Jun. 2006, the contents of which are incorporated herein by reference.

TECHNICAL FIELD

The present invention relates to a power output apparatus, a vehicle mounting the same, and a method for controlling a power output apparatus.

BACKGROUND ART

Conventionally, as such a power output apparatus, there has been proposed a vehicle-mounted power output apparatus having an engine, a planetary gear in which a carrier is connected to an output shaft of the engine and a ring gear is connected to a drive shaft, a motor MG1 connected to a sun gear of the planetary gear, and a motor MG2 selectively connected to the output shaft of the engine and the drive shaft through a clutch (for example, see Patent Document 1). According to the apparatus, at normal cruise, the motor MG2 is connected to the drive shaft so as to output a power from the engine to the drive shaft for torque conversion by functioning the motor MG1 as a generator and the motor MG2 as a motor; and when at high speed cruise, the motor MG1 is reversely rotated to function as a motor, the motor MG2 is connected to the output shaft of the engine and the motor MG2 is connected to the drive shaft for torque conversion, thereby causing the power circulation (power-electric power) which is prevented to increase the efficiency of the apparatus.

[Patent Document 1] Japanese Patent Laid-Open No. 11-332018

DISCLOSURE OF THE INVENTION

The above-described power output apparatus increases the efficiency of the apparatus by preventing the power circulation by connecting the motor MG2 to the two elements of the three elements for rotating the planetary gear. In general, it is considered to be a big problem with the power output apparatus to increase the efficiency of the apparatus.

An object of a power output apparatus, a vehicle mounting the same, and a method for controlling a power output apparatus according to the present invention is to increase the efficiency of the apparatus.

In order to achieve the above-described object, a power output apparatus, a vehicle mounting the same, and a method for controlling a power output apparatus according to the present invention takes the following measures.

The present invention is directed to a power output apparatus for outputting a power to a drive shaft. The power output apparatus includes: an internal combustion engine; a first motor capable of inputting and outputting power; a second motor capable of inputting and outputting power; a three shaft-type power input output module which is connected to three shafts: an engine shaft serving as an output shaft of the internal combustion engine, a first motor shaft serving as a rotating shaft of the first motor, and a third shaft, and inputs and outputs power to a remaining shaft based on the power input and output to any two of the three shafts; a first connection/disconnection module which connects and disconnects a second motor shaft serving as a rotating shaft of the second motor to and from the third shaft; a second connection/disconnection module which connects and disconnects the second motor shaft to and from the engine shaft; a third connection/disconnection module which connects and disconnects the drive shaft to and from the third shaft; and a fourth connection/disconnection module which connects and disconnects the drive shaft to and from the first motor shaft.

According to the power output apparatus of the present invention, the second motor shaft serving as the rotating shaft of the second motor is connected to and disconnected from the third shaft of the three shaft-type power input output module and the engine shaft serving as the output shaft of the internal combustion engine; and the drive shaft is connected to and disconnected from the third shaft of the three shaft-type power input output module and the first motor shaft serving as the rotating shaft of the first motor. Thereby, the connection relation when the power is output to the drive shaft is increased in comparison with only connecting and disconnecting the second motor shaft to and from the third shaft of the three shaft-type power input output module and the engine shaft. Accordingly, the power can be output to the drive shaft with a more efficient connection relation.

Such a power output apparatus of the present invention may be configured to further include a control module which controls the first connection/disconnection module, the second connection/disconnection module, the third connection/disconnection module, and the fourth connection/disconnection module so as to be a first connection state in which when the rotation speed of the drive shaft is in a predetermined low rotation range, the first connection/disconnection module connects the second motor shaft to the third shaft; the second connection/disconnection module disconnects the second motor shaft from the engine shaft; the third connection/disconnection module connects the drive shaft to the third shaft; and the fourth connection/disconnection module disconnects the drive shaft from the first motor shaft. By doing so, when the rotation speed of the drive shaft is in a predetermined low rotation range, the power can be output to the drive shaft by connecting the second motor to the third shaft, and connecting the drive shaft to the third shaft.

In the power output apparatus of the present invention of the embodiment of setting the first connection state when the rotation speed of the drive shaft is in a predetermined low rotation range, the control module may be configured such that when the rotation speed of the drive shaft is in a predetermined high rotation range, the control module controls so as to be a second connection state in which the first connection/disconnection module disconnects the second motor shaft from the third shaft; the second connection/disconnection module connects the second motor shaft to the engine shaft; the third connection/disconnection module connects the drive shaft to the third shaft; and the fourth connection/disconnection module disconnects the drive shaft from the first motor shaft. By doing so, when the rotation speed of the drive shaft is in a predetermined high rotation range, the power can be output to the drive shaft by connecting the second motor to the engine shaft, and connecting the drive shaft to the third shaft. In this case, the power output apparatus may be configured to further include an accumulator capable of sending and receiving an electric power to and from the first motor and the second motor, wherein the control module controls so as to be the second connection state when the rotation speed of the drive shaft is in the predetermined high rotation range, and the first motor shaft is rotated in a direction opposite to the engine shaft and the third shaft. Here, assuming that the accumulator is not charged or discharged, if control is performed so as to be the first connection state when the first motor shaft is rotated in a direction opposite to the engine shaft and the third shaft, a circulation of power-electric power-power (power circulation) may occur, in which the first motor outputs a power, a part of which is used by the second motor to generate an electric power, which is supplied to the first motor, which may remarkably decrease the efficiency of the vehicle. On the contrary, according to the power output apparatus of the present invention, control is performed so as to be the second connection state when the first motor shaft is rotated in a direction opposite to the engine shaft and the third shaft. Thereby, a part of the power from the internal combustion engine is used by the second motor connected to the engine shaft to generate an electric power, which is supplied to the first motor, thereby suppressing the power circulation and increasing the efficiency of the vehicle.

In the power output apparatus of the present invention of the embodiment of setting the second connection state when the rotation speed of the drive shaft is in a predetermined high rotation range, the power output apparatus may be configured to further include a first coupled rotating mechanism having a first coupled rotating shaft which is connected to the third shaft, and is rotated at approximately the same rotation speed as the rotation speed of the engine shaft when the rotation speed of the first motor shaft is a predetermined rotation speed, wherein the first connection/disconnection module connects and disconnects the second motor shaft to and from the first coupled rotating mechanism, and the control module controls so as to switch from the first connection state to the second connection state in synchronism with a rotation of the first coupled rotating shaft and the engine shaft when the connection state is the first connection state, and the rotation speed of the first motor shaft is a predetermined rotation speed. By doing so, the switch operation from the first connection state to the second connection state can be performed more smoothly. In this case, "the predetermined rotation speed" may be an approximate value of 0. Moreover, when the connection state is switched from the first connection state to the second connection state, the control module may be configured to control so as to switch from the first connection state to the second connection state through the first switch state in which the first connection/disconnection module connects the second motor shaft to the first coupled rotating mechanism; and the second connection/disconnection module connects the second motor shaft to the engine shaft. Further, configuration may be made such that the first connection/disconnection module has a dog clutch which connects and disconnects the second motor shaft to and from the first coupled rotating shaft; and the second connection/disconnection module has a dog clutch which connects and disconnects the second motor shaft to and from the engine shaft.

In the power output apparatus of the present invention of the embodiment of setting the first connection state when the rotation speed of the drive shaft is in a predetermined low rotation range, the power output apparatus may be configured such that when the rotation speed of the drive shaft is in a predetermined high rotation range, the control module controls so as to be a third connection state in which the first connection/disconnection module connects the second motor shaft to the third shaft; the second connection/disconnection module disconnects the second motor shaft from the engine shaft; the third connection/disconnection module disconnects the drive shaft from the third shaft; and the fourth connection/disconnection module connects the drive shaft to the first motor shaft. By doing so, the rotation speed of the drive shaft is in a predetermined high rotation range, the power can be output to the drive shaft by connecting the second motor to the third shaft and connecting the drive shaft to the first motor shaft.

In the power output apparatus of the present invention of the embodiment of setting the third connection state when the rotation speed of the drive shaft is in a predetermined high rotation range, the power output apparatus may be configured to further include a second coupled rotating mechanism having a second coupled rotating shaft coupled to the third shaft; and a third coupled rotating mechanism which is coupled to the first motor shaft, and is rotated at approximately the same rotation speed as the rotation speed of second coupled rotating shaft when the first motor shaft and the engine shaft are in a predetermined rotation state, wherein the third connection/disconnection module connects and disconnects the drive shaft to and from the second coupled rotating shaft; the fourth connection/disconnection module connects and disconnects the drive shaft to the third coupled rotating shaft; and the control module controls so as to switch from the first connection state to the third connection state in synchronism with the rotation of the second coupled rotating shaft and the third coupled rotating shaft when the connection state is the third connection state, and the first motor shaft and the engine shaft are in a predetermined rotation state. By doing so, the switch operation from the first connection state to the third connection state can be performed more smoothly. In addition, if the three shaft-type power input output module, the second coupled rotating mechanism, the third coupled rotating mechanism, and the like are made more properly, the power circulation can be difficult to occur by switching the connection state from the first connection state to the third connection state, thereby increasing the efficiency of the vehicle. In this case, when the connection state is switched from the first connection state to the third connection state, the control module may be configured to control so as to switch from the first connection state to the third connection state through a second switch state in which the third connection/disconnection module connects the drive shaft to the second coupled rotating shaft; and the fourth connection/disconnection module connects the drive shaft to the third coupled rotating shaft. Moreover, the configuration may be made such that the third connection/disconnection module has a dog clutch which connects and disconnects the drive shaft to and from the second coupled rotating shaft; and the fourth connection/disconnection module has a dog clutch which connects and disconnects the drive shaft to and from the third coupled rotating shaft.

The vehicle of the present invention is the vehicle mounting the power output apparatus of the present invention of any one of the above-described embodiments, that is basically the power output apparatus for outputting a power to the drive shaft. The vehicle may be characterized in that an axle thereof is coupled to the drive shaft and may be configured to mount the power output apparatus including an internal combustion engine; a first motor capable of inputting and outputting the power; a second motor capable of inputting and outputting the power; a three shaft-type power input output module which is connected to three shafts: an engine shaft serving as an output shaft of the internal combustion engine, a first motor shaft serving as a rotating shaft of the first motor, and a third shaft, and inputs and outputs the power to a remaining shaft based on the power input and output to any two of the three shafts; a first connection/disconnection module which connects and disconnects a second motor shaft serving as a rotating shaft of the second motor to and from the third shaft; a second connection/disconnection module which connects and disconnects the second motor shaft to and from the engine shaft; a third connection/disconnection module which connects and disconnects the drive shaft to and from the third shaft; and a fourth connection/disconnection module which connects and disconnects the drive shaft to and from the first motor shaft.

The vehicle of the present invention mounts the power output apparatus of the present invention of any one of the above-described embodiments, thereby producing the same effect as the effect produced by the power output apparatus of the present invention, for example, an effect of driving with a more efficient connection relation, and the like.

Present invention is directed to a method for controlling a power output apparatus. The power output apparatus includes an internal combustion engine; a first motor capable of inputting and outputting the power; a second motor capable of inputting and outputting the power; a three shaft-type power input output module which is connected to three shafts: an engine shaft serving as an output shaft of the internal combustion engine, a first motor shaft serving as a rotating shaft of the first motor, and a third shaft, and inputs and outputs the power to a remaining shaft based on the power input and output to any two of the three shafts; a first connection/disconnection module which connects and disconnects a second motor shaft serving as a rotating shaft of the second motor to and from the third shaft; a second connection/disconnection module which connects and disconnects the second motor shaft to and from the engine shaft; a third connection/disconnection module which connects and disconnects the drive shaft to and from the third shaft; and a fourth connection/disconnection module which connects and disconnects the drive shaft to and from the first motor shaft. The control method controls the first connection/disconnection module, the second connection/disconnection module, the third connection/disconnection module, and the fourth connection/disconnection module so as to be a first connection state in which when a rotation speed of the drive shaft is in a predetermined low rotation range, the first connection/disconnection module connects the second motor shaft to the third shaft; the second connection/disconnection module disconnects the second motor shaft from the engine shaft; the third connection/disconnection module connects the drive shaft to the third shaft; the fourth connection/disconnection module disconnects the drive shaft from the first motor shaft.

According to the method for controlling a power output apparatus of the present invention, the second motor shaft serving as the rotating shaft of the second motor is connected to and disconnected from the third shaft of the three shaft-type power input output module and the engine shaft serving as the output shaft of the internal combustion engine; and the drive shaft is connected to and disconnected from the third shaft of the three shaft-type power input output module and the first motor shaft serving as the rotating shaft of the first motor. Thereby, the connection relation when a power is output to the drive shaft is increased in comparison with only connecting and disconnecting the second motor shaft to and from the third shaft of the three shaft-type power input output module and the engine shaft. Accordingly, the power can be output to the drive shaft with a more efficient connection relation. In particular, when the rotation speed of the drive shaft is in a predetermined low rotation range, the power can be output to the drive shaft by connecting the second motor to the third shaft and connecting the drive shaft to the third shaft.

According to the method for controlling a power output apparatus of the present invention, when a rotation speed of the drive shaft is in a predetermined high rotation range, the control method may be characterized by controlling so as to be a second connection state in which the first connection/disconnection module disconnects the second motor shaft from the third shaft; the second connection/disconnection module connects the second motor shaft to the engine shaft; the third connection/disconnection module connects the drive shaft to the third shaft; and the fourth connection/disconnection module disconnects the drive shaft from the first motor shaft. By doing so, when the rotation speed of the drive shaft is in a predetermined high rotation range, the power can be output to the drive shaft by connecting the second motor to the engine shaft and connecting the drive shaft to the third shaft.

Moreover, according to the method for controlling a power output apparatus of the present invention, when the rotation speed of the drive shaft is in a predetermined high rotation range, the control method may be characterized by controlling so as to be a third connection state in which the first connection/disconnection module connects the second motor shaft to the third shaft; the second connection/disconnection module disconnects the second motor shaft from the engine shaft; the third connection/disconnection module disconnects the drive shaft from the third shaft; and the fourth connection/disconnection module connects the drive shaft to the first motor shaft. By doing so, when the rotation speed of the drive shaft is in a predetermined high rotation range, the power can be output to the drive shaft by connecting the second motor to the third shaft and connecting the drive shaft to the first motor shaft.

BEST MODE FOR CARRYING OUT THE INVENTION

Hereinafter, the best mode for carrying out the present invention will be described with reference to embodiments.

Figure 1:
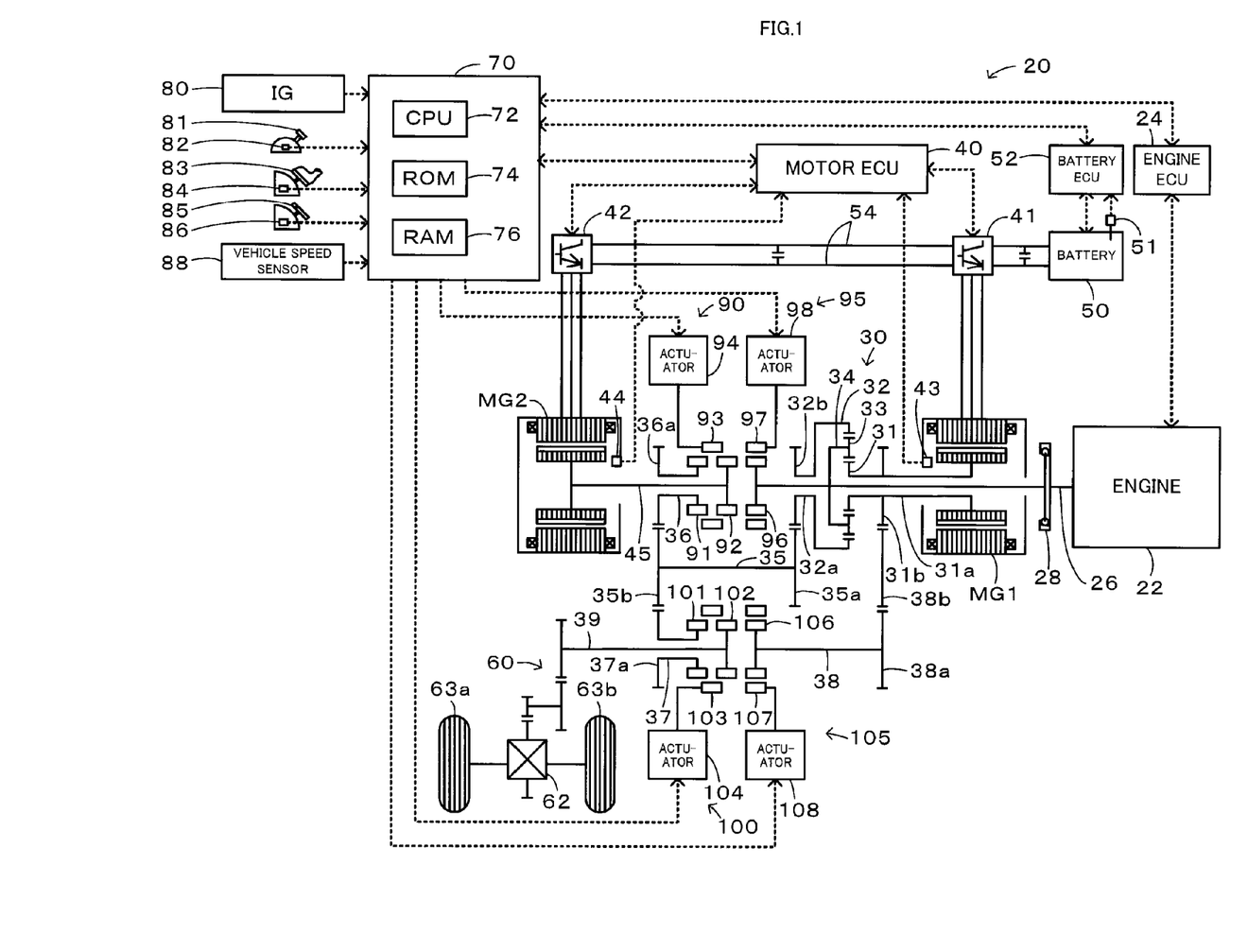
FIG. 1 is a block diagram illustrating a schematic configuration of a hybrid vehicle 20 mounting a power output apparatus as an embodiment of the present invention.

FIG. 1 is a block diagram illustrating a schematic configuration of a hybrid vehicle 20 mounting a power output apparatus as an embodiment of the present invention. As shown in the figure, the hybrid vehicle 20 of the present embodiment includes an engine 22; a three shaft-type power distribution and integration mechanism 30 connected to a crankshaft (engine shaft) 26 serving as an output shaft of the engine 22 through a damper 28; a generatable motor MG1 with a rotating shaft (first motor shaft) 31a connected to the power distribution and integration mechanism 30; a generatable motor MG2; a transmission shaft 35 coupled to a ring gear shaft 32a connected to the power distribution and integration mechanism 30; a first coupled rotating shaft 36 and a second coupled rotating shaft 37 coupled to the transmission shaft 35; a third coupled rotating shaft 38 coupled to the rotating shaft 31a of the motor MG1; a first connection/disconnection mechanism 90 for performing connection and disconnection between a rotating shaft (second motor shaft) 45 of the motor MG2 and the first coupled rotating shaft 36; a second connection/disconnection mechanism 95 for performing connection and disconnection between the rotating shaft 45 of the motor MG2 and the crankshaft 26 of the engine 22; a third connection/disconnection mechanism 100 for performing connection and disconnection between the second coupled rotating shaft 37 and the drive shaft 39 coupled to drive wheels 63a and 63b through a differential gear 62 and a gear mechanism 60; a fourth connection/disconnection mechanism 105 for performing connection and disconnection between the drive shaft 39 and the third coupled rotating shaft 38; and a hybrid electronic control unit 70 for controlling the entire power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

Figure 2:
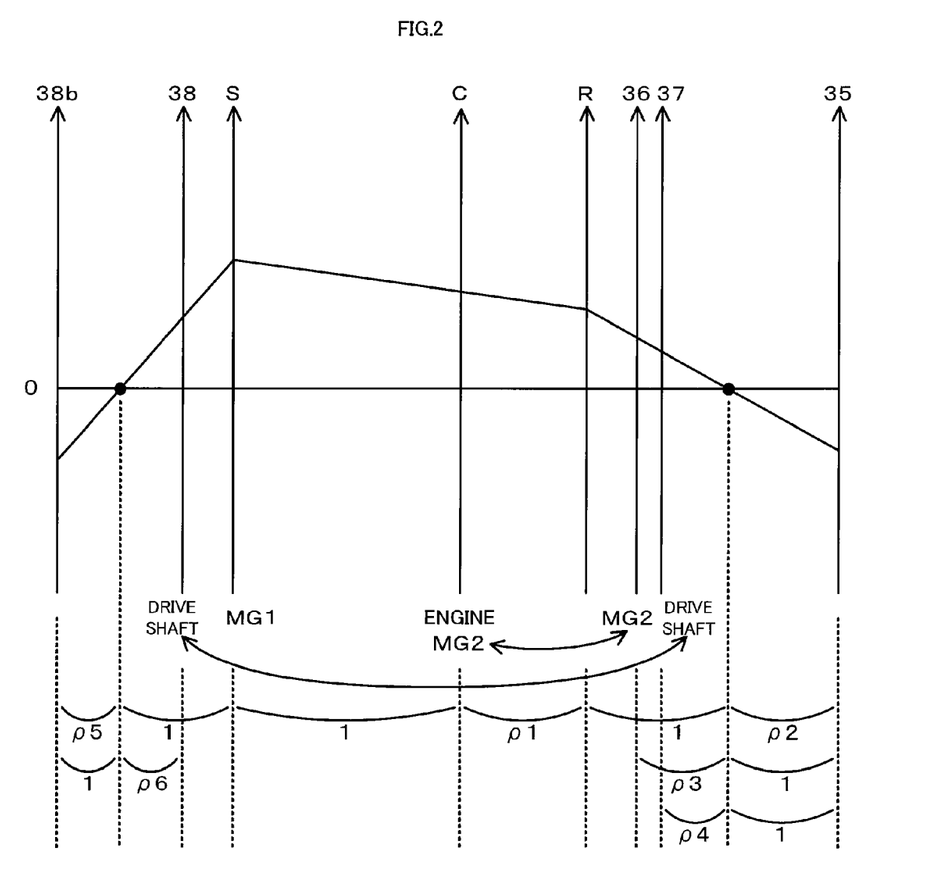
FIG. 2 is an explanatory drawing illustrating an example of an alignment chart for explaining the relationship of the rotation speed among the individual rotational elements of the power distribution and integration mechanism 30, a transmission shaft 35, the first to third coupled rotating shafts 36 to 38.

The power distribution and integration mechanism 30 includes a sun gear 31 as an external gear; a ring gear 32 as an internal gear arranged concentrically with the sun gear 31; a plurality of pinion gears 33 meshed with the sun gear 31 and the ring gear 32; and a carrier 34 which spinably and revolvably holds the plurality of pinion gears 33. The power distribution and integration mechanism 30 is configured as a planetary gear mechanism which uses the sun gear 31, the ring gear 32, and the carrier 34 as the rotational elements to perform a differential operation. In the power distribution and integration mechanism 30, the crankshaft 26 of the engine 22 is coupled to the carrier 34; the rotating shaft 31a of the motor MG1 is coupled to the sun gear 31; and a hollow ring gear shaft 32a having the gear 32b is coupled to the ring gear 32 respectively. The transmission shaft 35 is coupled to the gear 32b of the ring gear shaft 32a through a gear 35a; the first coupled rotating shaft 36 is coupled to the gear 35b of the transmission shaft 35 through a gear 36a; and the second coupled rotating shaft 37 is coupled to the gear 35b of the transmission shaft 35 through a gear 37a. The third coupled rotating shaft 38 is coupled to the gear 31b fixed to the rotating shaft 31a of the motor MG1 through gears 38a and 38b. FIG. 2 is an explanatory drawing illustrating an example of an alignment chart for explaining the relationship of the rotation speed among the individual rotational elements of the power distribution and integration mechanism 30, the transmission shaft 35, the first to third coupled rotating shafts 36 to 38. In the figure, the S axis indicates the rotation speed of the sun gear 31 (the rotating shaft 31a of the motor MG1) of the power distribution and integration mechanism 30; the C axis indicates the rotation speed of the carrier 34 (the crankshaft 26 of the engine 22) of the power distribution and integration mechanism 30; the R axis indicates the rotation speed of the ring gear 32 (the ring gear shaft 32a) of the power distribution and integration mechanism 30; the 38b axis indicates the rotation speed of the gear 38b; the 38 axis indicates the rotation speed of the third coupled rotating shaft 38; the 36 axis indicates the rotation speed of the first coupled rotating shaft 36; the 37 axis indicates the rotation speed of the second coupled rotating shaft 37 and the 35 axis indicates the rotation speed of the transmission shaft 35. The rotating shaft 45 of the motor MG2 is connected to the first coupled rotating shaft 36 or is connected to the carrier 34 by the first connection/disconnection mechanism 90 and the second connection/disconnection mechanism 95. The drive shaft 39 is connected to the second coupled rotating shaft 37 or is connected to the third coupled rotating shaft 38 by the third connection/disconnection mechanism 100 and the fourth connection/disconnection mechanism 105. The gear ratio ρ1 (the number of teeth of sun gear/the number of teeth of ring gear) of the power distribution and integration mechanism 30, the gear ratio ρ2 (the number of teeth of gear 32b/the number of teeth of gear 35a) of gears 32b and 35a, the gear ratio ρ3 (the number of teeth of gear 35b/the number of teeth of gear 36a) of gears 35b and 36a, the gear ratio ρ4 (the number of teeth of gear 35b/the number of teeth of gear 37a) of gears 35b and 37a, the gear ratio ρ5 (the number of teeth of gear 31b/the number of teeth of gear 38b) of gears 31b and 38b, and the gear ratio ρ6 (the number of teeth of gear 38b/the number of teeth of gear 38a) of gears 38b and 38a are adjusted such that the rotation speed (the rotation speed of the carrier 34) of the crankshaft 26 of the engine 22 is approximately the same as the rotation speed of the first coupled rotating shaft 36 when the rotation speed Nm1 of the motor MG1 is an approximate value of 0, and are adjusted such that the rotation speed of the second coupled rotating shaft 37 is approximately the same as the rotation speed of the third coupled rotating shaft 38 when the crankshaft 26 of the engine 22, the rotating shaft 31a of the motor MG1, and the rotating shaft 45 of the motor MG2 are rotated at an individual predetermined rotation speed. Moreover, the gear ratio ρ1 of the power distribution and integration mechanism 30, the gear ratio ρ2 of gears 32b and 35a, the gear ratio ρ3 of gears 35b and 36a, the gear ratio ρ4 of gears 35b and 37a, the gear ratio ρ5 of gears 31b and 38b, and the gear ratio ρ6 of gears 38b and 38a are adjusted such that the ease of rotation of the first coupled rotating shaft 36 at a negative rotation speed when the third coupled rotating shaft 38 is rotated at a relatively high rotation speed and the crankshaft 26 of the engine 22 is rotated at a relatively low rotation speed is lower than the ease of rotation of the sun gear 31 at a negative rotation speed when the second coupled rotating shaft 37 is rotated at a relatively high rotation speed and the crankshaft 26 of the engine 22 is rotated at a relatively low rotation speed, namely, such that the first coupled rotating shaft 36 for the latter case is more difficult to rotate at a negative rotation speed than the sun gear 31 for the former case.

The first connection/disconnection mechanism 90 is configured as a so called dog clutch, including a first coupled rotating shaft side gear 91 fixed to the hollow first coupled rotating shaft 36 coupled to the transmission shaft 35 through the gears 35b and 36a; a motor side gear 92 fixed to the rotating shaft 45 of the motor MG2 arranged coaxially with the first coupled rotating shaft 36; a first movable member 93; and an actuator 94 for moving the first movable member. The first coupled rotating shaft side gear 91 and the motor side gear 92 are formed into the same shape having teeth at the outer peripheral side and are arranged at a predetermined spacing. The first movable member 93, in which teeth meshable with the first coupled rotating shaft side gear 91 and the motor side gear 92 are provided at the inner peripheral side, can move back and forth a slightly longer distance than the distance corresponding to the predetermined spacing in the axial direction. When the rotation speed of the first coupled rotating shaft 36 is approximately the same as the rotation speed of the rotating shaft 45 of the motor MG2, the first connection/disconnection mechanism 90 moves the first movable member 93 back and forth in the axial direction using the actuator 94, thereby connecting and disconnecting the motor side gear 92 and the first coupled rotating shaft side gear 91, namely, connecting and disconnecting the rotating shaft 45 of the motor MG2 and the first coupled rotating shaft 36.

The second connection/disconnection mechanism 95 is also configured as a so called dog clutch, including a motor side gear 92; an engine side gear 96 fixed to the crankshaft 26 of the engine 22 arranged on a substantially extension of the rotating shaft 45 of the motor MG2; a second movable member 97; and an actuator 98 for moving the second movable member 97. The engine side gear 96 is formed into the same shape as the motor side gear 92; and the motor side gear 92 and the engine side gear 96 are arranged at a predetermined spacing. The second movable member 97, in which teeth meshable with the motor side gear 92 and the engine side gear 96 are provided at the inner peripheral side, can move back and forth a slightly longer distance than the distance corresponding to the predetermined spacing in the axial direction. When the rotation speed of the motor side gear 92 is approximately the same as the rotation speed of engine side gear 96, the second connection/disconnection mechanism 95 moves the second movable member 97 back and forth in the axial direction using the actuator 98, thereby connecting and disconnecting the motor side gear 92 and the engine side gear 96, namely, connecting and disconnecting the rotating shaft 45 of the motor MG2 and the crankshaft 26 of the engine 22.

The third connection/disconnection mechanism 100 is also configured as a so called dog clutch, including a second coupled rotating shaft side gear 101 fixed to the hollow second coupled rotating shaft 37 coupled to the transmission shaft 35 through the gears 35b and 37a; a drive shaft side gear 102 fixed to the drive shaft 39 arranged coaxially with the second coupled rotating shaft 36; a third movable member 103; and an actuator 104 for moving the third movable member 103. The second coupled rotating shaft side gear 101 and the drive shaft side gear 102 are formed into the same shape as the first coupled rotating shaft side gear 91 and the like and are arranged at a predetermined spacing. The third movable member 103, in which teeth meshable with the second coupled rotating shaft side gear 101 and the drive shaft side gear 102 are provided at the inner peripheral side, can move back and forth a slightly longer distance than the distance corresponding to the predetermined spacing in the axial direction. When the rotation speed of the drive shaft 39 is approximately the same as the rotation speed of the second coupled rotating shaft 37, the third connection/disconnection mechanism 100 moves the third movable member 103 back and forth in the axial direction using the actuator 104, thereby connecting and disconnecting the drive shaft side gear 102 and the second coupled rotating shaft side gear 101, namely, connecting and disconnecting the drive shaft 39 and the second coupled rotating shaft 37.

The fourth connection/disconnection mechanism 105 is also configured as a so called dog clutch, including the drive shaft side gear 102; a third coupled rotating shaft side gear 106 fixed to the third coupled rotating shaft 38 arranged on a substantially extension of the drive shaft 39 and coupled to the rotating shaft 31a of the motor MG1 through the gears 31b, 38b, and 38a; a fourth movable member 107; and an actuator 108 for moving the fourth movable member 107. The third coupled rotating shaft side gear 106 is formed into the same shape as the drive shaft side gear 102; and the drive shaft side gear 102 and the third coupled rotating shaft side gear 106 are arranged at a predetermined spacing. The fourth movable member 107, in which teeth meshable with the drive shaft side gear 102 and the third coupled rotating shaft side gear 106 are provided at the inner peripheral side, can move back and forth a slightly longer distance than the distance corresponding to the predetermined spacing in the axial direction. When the rotation speed of the drive shaft 39 is approximately the same as the rotation speed of the third coupled rotating shaft 38, the fourth connection/disconnection mechanism 105 moves the third coupled rotating shaft side gear 107 back and forth in the axial direction using the actuator 108, thereby connecting and disconnecting the drive shaft side gear 102 and the third coupled rotating shaft side gear 106, namely, connecting and disconnecting the drive shaft 39 and the third coupled rotating shaft 38.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs signals including drive signals to the actuators 94, 98, 104 and 108. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the present embodiment can run by outputting a power to the drive shaft 39 according to various operation modes by changing the state of the first to fourth connection/disconnection mechanisms 90, 95, 100, and 105. The state of the first to fourth connection/disconnection mechanisms 90, 95, 100, and 105 include a first connection state in which the rotating shaft 45 of the motor MG2 is connected to the first coupled rotating shaft 36 and the drive shaft 39 is connected to the second coupled rotating shaft 37; a second connection state in which the rotating shaft 45 of the motor MG2 is connected to the crankshaft 26 (the carrier 34 of the power distribution and integration mechanism 30) of the engine 22 and the drive shaft 39 is connected to the second coupled rotating shaft 37; a third connection state in which the rotating shaft 45 of the motor MG2 is connected to the second coupled rotating shaft 37 and the drive shaft 39 is connected to the third coupled rotating shaft 38; a fourth connection state in which the rotating shaft 45 of the motor MG2 is connected to the crankshaft 26 of the engine 22 and the drive shaft 39 is connected to the third coupled rotating shaft 38 and the like. Then, one connection state is selected from the first to fourth connection states and the like, and the torque demand to be output to the drive shaft 39 is calculated based on an accelerator opening Acc and a vehicle speed V corresponding to the amount of depression of an accelerator pedal 83 by the driver. Then, the operation of the engine 22, the motor MG1, and the motor MG2 is controlled so as to output the drive power demand corresponding to the torque demand to the drive shaft 39. The operation control mode includes a torque conversion operation mode in which the operation of the engine 22, the motor MG1, and the motor MG2 is controlled such that the engine 22 is operated at an operation point (rotation speed and torque) set such that a power corresponding to the drive power demand is output from the engine 22, and the driving of the motor MG 1 and the motor MG 2 is controlled such that the torque of the entire power output from the engine 22 is converted by the power distribution and integration mechanism 30, the transmission shaft 35, the first coupled rotating shaft 36, the second coupled rotating shaft 37, the third coupled rotating shaft 38, the motor MG1, and the motor MG2, and then is output to the drive shaft 39; a charge/discharge operation mode in which the operation of the engine 22 is controlled such that the power corresponding to the sum of the drive power demand and the electric power necessary for charging/discharging of the battery 50 is output from the engine 22, and the driving of the motor MG 1 and the MG 2 is controlled such that the torque of the entire or part of the power output from the engine 22 with the charging/discharging of the battery 50 is converted by the power distribution and integration mechanism 30, the transmission shaft 35, the first coupled rotating shaft 36, the second coupled rotating shaft 37, the third coupled rotating shaft 38, the motor MG 1, and the motor MG 2, and then the drive power demand is output to the drive shaft 39; and a motor operation mode in which the operation of the vehicle is controlled such that the engine 22 is stopped, and a power corresponding to the drive power demand from at least one of the motor MG1 and the motor MG 2 is output to the drive shaft 39. Hereinafter, the first to fourth connection states will be described.

Figure 3:
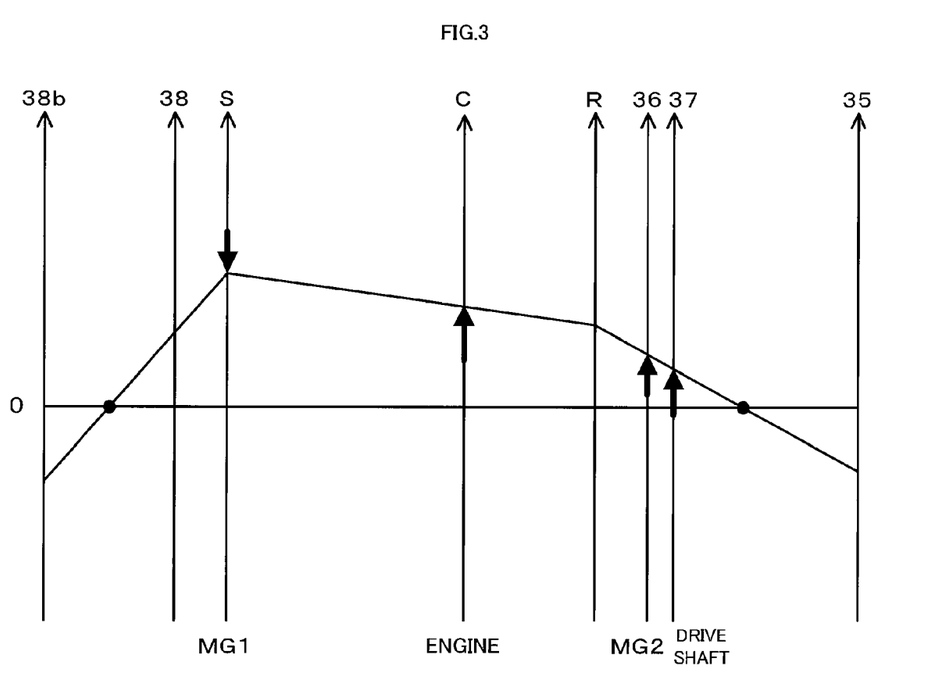
FIG. 3 is an explanatory drawing illustrating an example of an alignment chart for mechanically explaining the relationship of the rotation speed among the individual rotational elements of the power distribution and integration mechanism 30, a transmission shaft 35, the first to third coupled rotating shafts 36 to 38 in a first connection state.

FIG. 3 is an explanatory drawing illustrating an example of an alignment chart for mechanically explaining the relationship of the rotation speed among the individual rotational elements of the power distribution and integration mechanism 30, a transmission shaft 35, the first to third coupled rotating shafts 36 to 38 in the first connection state in which the rotating shaft 45 of the motor MG2 is connected to the first coupled rotating shaft 36 and the drive shaft 39 is connected to the second coupled rotating shaft 37. According to the present embodiment, the first connection state is assumed to be selected when the vehicle runs at a relatively low speed (e.g., the rotation speed of the drive shaft 39 is less than a predetermined rotation speed Nref1). Assuming that the battery 50 is not charged or discharged in the first connection state, when both the sun gear 31 and the ring gear 32 of the power distribution and integration mechanism 30 are rotated at a positive rotation speed, the motor MG1 functions as a generator, and the motor MG2 functions as a motor. Therefore, a part of the power from the engine 22 is output to the drive shaft 39 with electric power generated by the motor MG1 through the ring gear shaft 32$a$, the transmission shaft 35, and the second coupled rotating shaft 37, and a power from the motor MG2 is output to the drive shaft 39 through the transmission shaft 35 and the second coupled rotating shaft 37.

Figure 4:
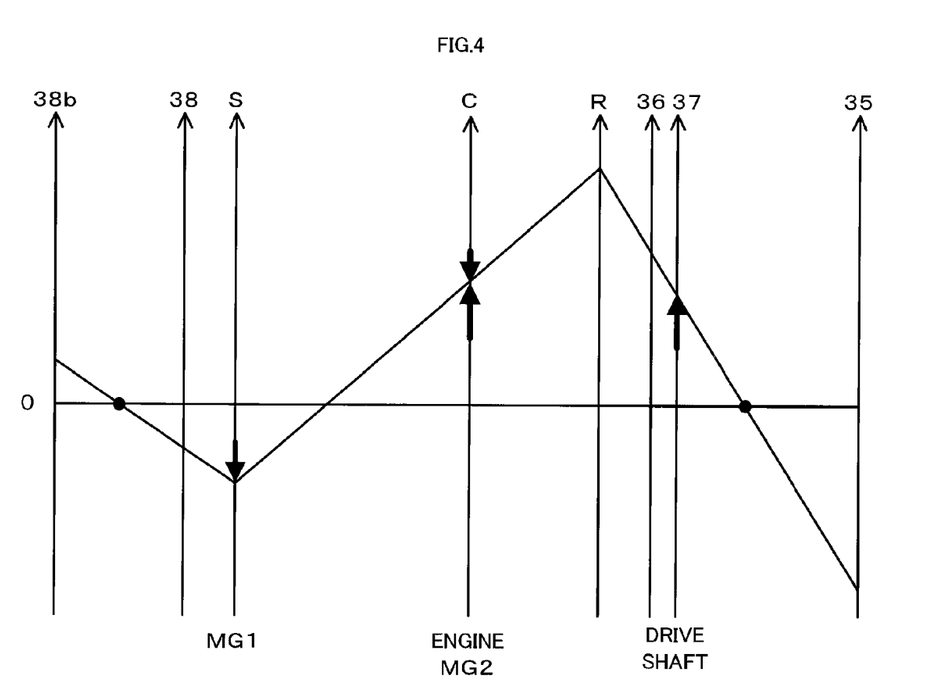
FIG. 4 is an explanatory drawing illustrating an example of an alignment chart for mechanically explaining the relationship of the rotation speed among the individual rotational elements of the power distribution and integration mechanism 30, a transmission shaft 35, the first to third coupled rotating shafts 36 to 38 in a second connection state.

FIG. 4 is an explanatory drawing illustrating an example of an alignment chart for mechanically explaining the relationship of the rotation speed among the individual rotational elements of the power distribution and integration mechanism 30, a transmission shaft 35, the first to third coupled rotating shafts 36 to 38 in the second connection state in which the rotating shaft 45 of the motor MG2 is connected to the crankshaft 26 of the engine 22, and the drive shaft 39 is connected to the second coupled rotating shaft 37. According to the present embodiment, the second connection state is assumed to be selected when the vehicle runs at a relatively high speed (e.g., the rotation speed of the drive shaft 39 is equal to or greater than a predetermined rotation speed Nref1), and the motor MG1 is rotated at a negative rotation speed (the motor MG1 is rotated in a direction opposite to the crankshaft 26 of the engine 22 and the ring gear shaft 32$a$). Assuming that the battery 50 is not charged or discharged in the second connection state, the motor MG1 functions as a motor, and the motor MG2 functions as a generator. Therefore, the motor MG2 uses a part of the power from the engine 22 to generate electric power, and the remaining power from the engine 22 is output to the drive shaft 39 with electric power consumed by the motor MG1 through the ring gear shaft 32$a$, transmission shaft 35, and the second coupled rotating shaft 37.

Figure 5:
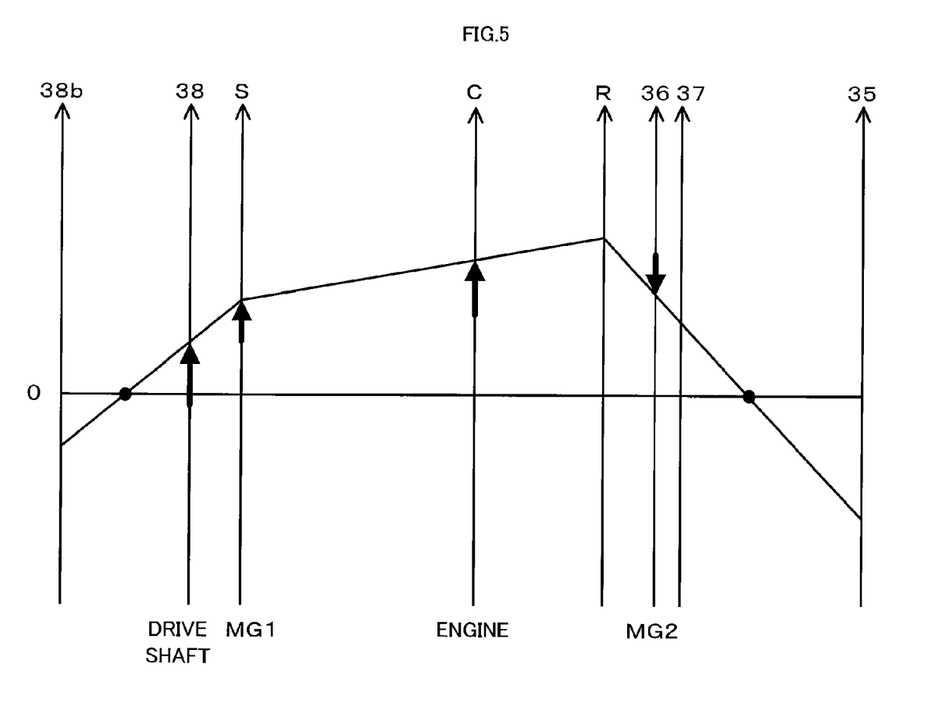
FIG. 5 is an explanatory drawing illustrating an example of an alignment chart for mechanically explaining the relationship of the rotation speed among the individual rotational elements of the power distribution and integration mechanism 30, the transmission shaft 35, the first to third coupled rotating shafts 36 to 38 in a third connection state.

FIG. 5 is an explanatory drawing illustrating an example of an alignment chart for mechanically explaining the relationship of the rotation speed among the individual rotational elements of the power distribution and integration mechanism 30, a transmission shaft 35, the first to third coupled rotating shafts 36 to 38 in a third connection state in which the rotating shaft 45 of the motor MG2 is connected to the second coupled rotating shaft 37, and the drive shaft 39 is connected to the third coupled rotating shaft 38. According to the present embodiment, the third connection state is assumed to be selected when the vehicle runs at a relatively high speed (e.g., the rotation speed of the drive shaft 39 is equal to or greater than a predetermined rotation speed Nref1 or a predetermined rotation speed Nref2 different from the predetermined rotation speed Nref1). Assuming that the battery 50 is not charged or discharged in the third connection state, the motor MG1 can function as a motor, and the motor MG2 can function as a generator. In other words, the torque output from the motor MG2 to the ring gear shaft 32a through the first coupled rotating shaft 36 and the transmission shaft 35 can be used to output a part of the power from the engine 22 to the drive shaft 39 through the sun gear 31 and the third coupled rotating shaft 38, and to output the power from the motor MG1 to the drive shaft 39 through the third coupled rotating shaft 38.

In a fourth connection state in which the rotating shaft 45 of the motor MG2 is connected to the crankshaft 26 of the engine 22, and the drive shaft 39 is connected to the third coupled rotating shaft 38, a power from the motor MG1 is output to the drive shaft 39 through the third coupled rotating shaft 38. It should be noted that in this case, the ring gear 32 of the power distribution and integration mechanism 30 is in a free state, and thus no power from the engine 22 is output to the drive shaft 39.

According to the hybrid vehicle 20 of the present embodiment, the first connection state is switched to the second connection state or the third connection state when a state of running at a relatively low speed in the first connection state is shifted to a state of cruising at a relatively high speed by acceleration, namely, when shifted to a state where the drive shaft 39 is rotated at a relatively high rotation speed and the engine 22 is operated with a relatively low rotation and low torque (for example, a state where the drive shaft 39 is rotated at a rotation speed equal to or greater than a predetermined rotation speed Nref1 or a predetermined rotation speed Nref2, and the engine 22 is rotated at a very low rotation speed compared with the predetermined rotation speed Nref1 or the predetermined rotation speed Nref2). First, the operation of switching from the first connection state to the second connection state will be described. First, the rotation speed of the ring gear 32 is increased with acceleration and is shifted to a relatively high cruise speed. When the rotation speed of the motor MG1 reaches an approximate value of 0, namely, when the rotation speed of the first coupled rotating shaft 36 is approximately the same as the rotation speed of the crankshaft 26 (the carrier 34 of the power distribution and integration mechanism 30) of the engine 22, the second movable member 97 of the second connection/disconnection mechanism 95 is moved in the axial direction to connect the rotating shaft 45 of the motor MG2 to the crankshaft 26 of the engine 22, and the first movable member 93 of the first connection/disconnection mechanism 90 is moved in the axial direction to disconnect the rotating shaft 45 of the motor MG2 from the first coupled rotating shaft 36. Thereby, the first connection state is switched to the second connection state for cruising at a relatively high speed. The reason why the connection state is switched from the first connection state to the second connection state when the vehicle cruises at a relatively high speed is as follows. If the vehicle cruises at a relatively high speed in the first connection state, when the motor MG1 is rotated at a negative rotation speed, the motor MG2 uses a part of the power output from the motor MG1 to generate electric power and supplies the power to the motor MG1, thereby causing a circulation of power-electric power-power (hereinafter referred to as the power circulation), which remarkably decreases the efficiency of the vehicle. On the contrary, when the first connection state is switched to the second connection state, the motor MG2 connected to the crankshaft 26 of the engine 22 uses a part of the power from the engine 22 to generate electric power and supplies the power to the motor MG1, thereby suppressing the power circulation and increasing the energy efficiency of the vehicle. For this reason, the first connection state is switched to the second connection state when shifted to a relatively high cruise speed. In addition, according to the present embodiment, when the first connection state is switched to the second connection state, the rotating shaft 45 of the motor MG2 is connected to the crankshaft 26 of the engine 22 and then the rotating shaft 45 of the motor MG2 is disconnected from the second coupled rotating shaft 36, thereby suppressing a rotational fluctuation of the rotating shaft 45 caused by releasing the rotating shaft 45 of the motor MG2 into a free state and ensuring a more smooth switching operation from the first connection state to the second connection state. Further, according to the present embodiment, the first and second connection/disconnection mechanism 90 and 95 are configured as dog clutches and thus the actuators 94 and 98 may be driven only when switched from the first connection state to the second connection state, thereby reducing the time to drive the actuators 94 and 98 in comparison with connecting the rotating shaft 45 of the motor MG2 to the first coupled rotating shaft 36 and the crankshaft 26 of the engine 22 using hydraulic pressure and the like.

Subsequently, the operation of switching from the first connection state to the third connection state will be described. When the rotation speed of the ring gear 32 is increased, the sun gear 31, the carrier 34, and the ring gear 32 are all rotated at a positive rotation speed. When the rotation speed of the second coupled rotating shaft 37 is approximately the same as the rotation speed of the third coupled rotating shaft 38, the fourth movable member 107 of the fourth connection/disconnection mechanism 105 is moved in the axial direction to connect the drive shaft 39 to the third coupled rotating shaft 38, and the third movable member 103 of the third connection/disconnection mechanism 100 is moved in the axial direction to disconnect the drive shaft 39 from the second coupled rotating shaft 37, thereby switching to the third connection state for cruising at a relatively high speed. The reason why the connection state is switched from the first connection state to the third connection state when the vehicle cruises at a relatively high speed is as follows. The reason why the power circulation occurs in the first connection state for cruising at a relatively high speed has described hereinbefore. Moreover, as described above, the gear ratio ρ1 of the power distribution and integration mechanism 30, the gear ratio ρ2 of gears 32b and 35a, the gear ratio ρ3 of gears 35b and 36a, the gear ratio ρ4 of gears 35b and 37a, the gear ratio ρ5 of gears 31b and 38b, and the gear ratio ρ6 of gears 38b and 38a are adjusted such that the ease of rotation of the first coupled rotating shaft 36 at a negative rotation speed when the third coupled rotating shaft 38 is rotated at a relatively high rotation speed and the crankshaft 26 of the engine 22 is rotated at a relatively low rotation speed is lower than the ease of rotation of the sun gear 31 at a negative rotation speed when the second coupled rotating shaft 37 is rotated at a relatively high rotation speed and the crankshaft 26 of the engine 22 is rotated at a relatively low rotation speed, namely, such that the first coupled rotating shaft 36 for the latter case is more difficult to rotate at a negative rotation speed than the sun gear 31 for the former case. When the vehicle cruises at a relatively high speed, the power circulation is more different to occur in the third connection state where the motor MG1 can function as a motor and the motor MG2 can function as a generator in comparison with the first connection state where the motor MG1 can function as a generator and the motor MG2 can function as a motor, thereby increasing the energy efficiency of the vehicle. For this reason, the first connection state is switched to the third connection state when shifted to a relatively high cruise speed. In addition, according to the present embodiment, when the first connection state is switched to the third connection state, the drive shaft 39 is connected to the third coupled rotating shaft 38 and then the drive shaft 39 is disconnected from the second coupled rotating shaft 37, thereby suppressing a rotational fluctuation of the drive shaft 39 caused by releasing the drive shaft 39 into a free state both from the second coupled rotating shaft 37 and the third coupled rotating shaft 38, thereby ensuring a more smooth switching operation from the first connection state to the third connection state. Further, according to the present embodiment, the third and fourth connection/disconnection mechanism 100 and 105 are configured as dog clutches and thus the actuators 104 and 108 may be driven only when switched from the first connection state to the third connection state, thereby reducing the time to drive the actuators 104 and 108 in comparison with connecting the drive shaft 39 to second coupled rotating shaft 37 and third coupled rotating shaft 38 using hydraulic pressure and the like.

According to the hybrid vehicle 20 of the present embodiment described hereinbefore, the rotating shaft 45 of the motor MG2 is connected and disconnected to and from the first coupled rotating shaft 36 and the crankshaft 26 of the engine 22, and the drive shaft 39 is connected and disconnected to and from the second coupled rotating shaft 37 and the third coupled rotating shaft 38, thereby increasing the connection state when a power is output to the drive shaft 39, and outputting the power to the drive shaft 39 in a more efficient connection state in comparison with connecting and disconnecting the rotating shaft 45 of the motor MG2 to and from the first coupled rotating shaft 36 and the crankshaft 26 of the engine 22.

According to the hybrid vehicle 20 of the present embodiment, the connection state is switched from the first connection state to the second connection state in synchronism with the rotation of the first coupled rotating shaft 36 and the crankshaft 26 of the engine 22, and the connection state is switched from the first connection state to the third connection state in synchronism with the rotation of the second coupled rotating shaft 37 and the third coupled rotating shaft 38, thereby ensuring a smooth switching operation from the first connection state to the second connection state or the third connection state. In addition, when the connection state is switched from the first connection state to the second connection state, the rotating shaft 45 of the motor MG2 is connected to the crankshaft 26 of the engine 22 and then the rotating shaft 45 of the motor MG2 is disconnected from the first coupled rotating shaft 36, and when the connection state is switched from the first connection state to the third connection state, the drive shaft 39 is connected to the third coupled rotating shaft 38 and then the drive shaft 39 is disconnected from the second coupled rotating shaft 37, thereby ensuring a more smooth switching operation from the first connection state to the second connection state or the third connection state.

According to the hybrid vehicle 20 of the present embodiment, the operation of switching from the first connection state to the second connection state and the operation of switching from the first connection state to the third connection state have been described hereinbefore. The operation of switching from the second connection state to the first connection state may be configured such that when the rotation speed of the first coupled rotating shaft 36 is approximately the same as the rotation speed of the crankshaft 26 of the engine 22, the rotating shaft 45 of the motor MG2 is connected to the first coupled rotating shaft 36 and then the rotating shaft 45 of the motor MG2 is disconnected from the crankshaft 26 of the engine 22. The operation of switching from the third connection state to the first connection state may be configured such that when the rotation speed of the second coupled rotating shaft 37 is approximately the same as the rotation speed of the third coupled rotating shaft 38, the drive shaft 39 is connected to the second coupled rotating shaft 37 and then the drive shaft 39 is disconnected from the third coupled rotating shaft 38. By doing so, the switching operation from the second connection state to the first connection state and the switching operation from the third connection state to the first connection state can be performed more smoothly.

According to the hybrid vehicle 20 of the present embodiment, the gear ratio ρ1 of the power distribution and integration mechanism 30, the gear ratio ρ2 of gears 32b and 35a, the gear ratio ρ3 of gears 36b and 35a are adjusted such that the rotation speed of the crankshaft 26 of the engine 22 is approximately the same as the rotation speed of the first coupled rotating shaft 36 when the rotation speed of the motor MG1 is an approximate value of 0, but the gear ratios may be adjusted such that the rotation speed of the crankshaft 26 of the engine 22 is approximately the same as the rotation speed of the first coupled rotating shaft 36 when the rotation speed of the motor MG1 reaches a predetermined rotation speed Nref3 other than an approximate value of 0. At this time, when the rotation speed of the motor MG1 reaches a predetermined rotation speed Nref3, the connection state may be switched from the first connection state to the second connection state.

According to the hybrid vehicle 20 of the present embodiment, when the connection state is switched from the first connection state to the second connection state, the rotating shaft 45 of the motor MG2 is connected to the crankshaft 26 of the engine 22 and then the rotating shaft 45 of the motor MG2 is disconnected from the second coupled rotating shaft 36, but the rotating shaft 45 of the motor MG2 may be disconnected from the second coupled rotating shaft 36, and then the rotating shaft 45 of the motor MG2 may be connected to the crankshaft 26 of the engine 22. Moreover, according to the hybrid vehicle 20 of the present embodiment, when the connection state is switched from the first connection state to the third connection state, the drive shaft 39 is connected to the third coupled rotating shaft 38 and then the drive shaft 39 is disconnected from the second coupled rotating shaft 37, but the drive shaft 39 may be disconnected from the second coupled rotating shaft 37 and then the drive shaft 39 may be connected to the third coupled rotating shaft 38.

According to the hybrid vehicle 20 of the present embodiment, the first connection state is selected when the vehicle runs at a relatively low speed, and the second connection state or the third connection state is selected when the vehicle runs at a relatively high speed, but the method of selecting the connection state is not limited to this.

According to the hybrid vehicle 20 of the present embodiment, the first to fourth connection/disconnection mechanisms 90, 95, 100, and 105 are configured each as a dog clutch, but may be configured each as a synchromesh clutch and the like instead of this.

According to the present embodiment, an embodiment of mounting the power output apparatus on the hybrid vehicle 20 has been described, but the power output apparatus 20 of the present embodiment may be mounted on a vehicle other than the hybrid vehicle, an airplane, a marine vessel, and other movable body, and may also be incorporated as a power source of a non-movable facility such as a construction facility.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description

INDUSTRIAL APPLICABILITY

The present invention can be used for a manufacturing industry for a power output apparatus and a vehicle.

The invention claimed is:

1. A power output apparatus for outputting a power to a drive shaft, said power output apparatus comprising:
   an internal combustion engine;
   a first motor capable of inputting and outputting power;
   a second motor capable of inputting and outputting power;
   a three shaft-type power input output module which is connected to three shafts: an engine shaft serving as an output shaft of said internal combustion engine, a first motor shaft serving as a rotating shaft of said first motor, and a third shaft, and inputs and outputs power to a remaining shaft based on the power input and output to any two of said three shafts;
   a first connection/disconnection module which connects and disconnects a second motor shaft serving as a rotating shaft of said second motor to and from said third shaft;
   a second connection/disconnection module which connects and disconnects said second motor shaft to and from said engine shaft;
   a third connection/disconnection module which connects and disconnects said drive shaft to and from said third shaft; and
   a fourth connection/disconnection module which connects and disconnects said drive shaft to and from said first motor shaft.

2. A power output apparatus according to claim 1, said power output apparatus further comprising a control module which controls said first connection/disconnection module, said second connection/disconnection module, said third connection/disconnection module, and said fourth connection/disconnection module so as to be a first connection state in which when a rotation speed of said drive shaft is in a predetermined low rotation range, said first connection/disconnection module connects said second motor shaft to said third shaft; said second connection/disconnection module disconnects said second motor shaft from said engine shaft; said third connection/disconnection module connects said drive shaft to said third shaft; and said fourth connection/disconnection module disconnects said drive shaft from said first motor shaft.

3. A power output apparatus according to claim 2, wherein when a rotation speed of said drive shaft is in a predetermined high rotation range, said control module controls so as to be a second connection state in which said first connection/disconnection module disconnects said second motor shaft from said third shaft; said second connection/disconnection module connects said second motor shaft to said engine shaft; said third connection/disconnection module connects said drive shaft to said third shaft; and said fourth connection/disconnection module disconnects said drive shaft from said first motor shaft.

4. A power output apparatus according to claim 3, said power output apparatus further comprising:
   an accumulator capable of sending and receiving an electric power between said first motor and said second motor;
   wherein said control module controls so as to be said second connection state when the rotation speed of said drive shaft is in said predetermined high rotation range, and said first motor shaft is rotated in a direction opposite to said engine shaft and said third shaft.

5. A power output apparatus according to claim 3, said power output apparatus further comprising:
   a first coupled rotating mechanism having a first coupled rotating shaft which is connected to said third shaft, and is rotated at approximately the same rotation speed as the rotation speed of said engine shaft when the rotation speed of said first motor shaft is a predetermined rotation speed,
   wherein said first connection/disconnection module connects and disconnects said second motor shaft to and from said first coupled rotating mechanism, and
   said control module controls so as to switch from said first connection state to said second connection state in synchronism with a rotation of said first coupled rotating shaft and said engine shaft when the connection state is said first connection state, and the rotation speed of said first motor shaft is a predetermined rotation speed.

6. A power output apparatus according to claim 5, wherein said predetermined rotation speed is an approximate value of 0.

7. A power output apparatus according to claim 5, wherein when the connection state is switched from said first connection state to said second connection state, said control module controls so as to switch from said first connection state to said second connection state through a first switch state in which said first connection/disconnection module connects said second motor shaft to said first coupled rotating mechanism; and said second connection/disconnection module connects said second motor shaft to said engine shaft.

8. A power output apparatus according to claim 5, wherein said first connection/disconnection module has a dog clutch which connects and disconnects said second motor shaft to and from said first coupled rotating shaft; and
   said second connection/disconnection module has a dog clutch which connects and disconnects said second motor shaft to and from said engine shaft.

9. A power output apparatus according to claim 2, wherein when the rotation speed of said drive shaft is in a predetermined high rotation range, said control module controls so as to be a third connection state in which said first connection/disconnection module connects said second motor shaft to said third shaft; said second connection/disconnection module disconnects said second motor shaft from said engine shaft; said third connection/disconnection module disconnects said drive shaft from said third shaft; and said fourth connection/disconnection module connects said drive shaft to said first motor shaft.

10. A power output apparatus according to claim 9, said power output apparatus further comprising:
    a second coupled rotating mechanism having a second coupled rotating shaft coupled to said third shaft; and
    a third coupled rotating mechanism which is coupled to said first motor shaft, and is rotated at approximately the same rotation speed as the rotation speed of second coupled rotating shaft when said first motor shaft and said engine shaft are in a predetermined rotation state, wherein said third connection/disconnection module connects and disconnects said drive shaft to and from said second coupled rotating shaft;

said fourth connection/disconnection module connects and disconnects said drive shaft to and from said third coupled rotating shaft; and said control module controls so as to switch from the first connection state to said third connection state in synchronism with the rotation of said second coupled rotating shaft and said third coupled rotating shaft when the connection state is said third connection state, and said first motor shaft and said engine shaft are in a predetermined rotation state.

11. A power output apparatus according to claim 10, wherein when the connection state is switched from said first connection state to said third connection state, said control module controls so as to switch from said first connection state to said third connection state through a second switch state in which said third connection/disconnection module connects said drive shaft to said second coupled rotating shaft; and said fourth connection/disconnection module connects said drive shaft to said third coupled rotating shaft.

12. A power output apparatus according to claim 10, wherein said third connection/disconnection module has a dog clutch which connects and disconnects said drive shaft to and from said second coupled rotating shaft; and said fourth connection/disconnection module has a dog clutch which connects and disconnects said drive shaft to and from said third coupled rotating shaft.

13. A vehicle mounting a power output apparatus, for outputting a power to a drive shaft, said power output apparatus comprising: an internal combustion engine; a first motor capable of inputting and outputting power; a second motor capable of inputting and outputting power; a three shaft-type power input output module which is connected to three shafts: an engine shaft serving as an output shaft of said internal combustion engine, a first motor shaft serving as a rotating shaft of said first motor, and a third shaft, and inputs and outputs power to a remaining shaft based on the power input and output to any two of said three shafts; a first connection/disconnection module which connects and disconnects a second motor shaft serving as a rotating shaft of said second motor to and from said third shaft; a second connection/disconnection module which connects and disconnects said second motor shaft to and from said engine shaft; a third connection/disconnection module which connects and disconnects said drive shaft to and from said third shaft; and a fourth connection/disconnection module which connects and disconnects said drive shaft to and from said first motor shaft, wherein an axle thereof is coupled to said drive shaft.

14. A method for controlling a power output apparatus comprising an internal combustion engine; a first motor capable of inputting and outputting the power; a second motor capable of inputting and outputting the power; a three shaft-type power input output module which is connected to three shafts: an engine shaft serving as an output shaft of said internal combustion engine, a first motor shaft serving as a rotating shaft of said first motor, and a third shaft, and inputs and outputs the power to a remaining shaft based on the power input and output to any two of said three shafts; a first connection/disconnection module which connects and disconnects a second motor shaft serving as a rotating shaft of said second motor to and from said third shaft; a second connection/disconnection module which connects and disconnects said second motor shaft to and from said engine shaft; a third connection/disconnection module which connects and disconnects said drive shaft to and from said third shaft; and a fourth connection/disconnection module which connects and disconnects said drive shaft to and from said first motor shaft, said control method controlling said first connection/disconnection module, said second connection/disconnection module, said third connection/disconnection module, and said fourth connection/disconnection module so as to be a first connection state in which when a rotation speed of said drive shaft is in a predetermined low rotation range, said first connection/disconnection module connects said second motor shaft to said third shaft; said second connection/disconnection module disconnects said second motor shaft from said engine shaft; said third connection/disconnection module connects said drive shaft to said third shaft; said fourth connection/disconnection module disconnects said drive shaft from said first motor shaft.

15. A method for controlling a power output apparatus according to claim 14, wherein when a rotation speed of said drive shaft is in a predetermined high rotation range, said control method controls so as to be a second connection state in which said first connection/disconnection module disconnects said second motor shaft from said third shaft; said second connection/disconnection module connects said second motor shaft to said engine shaft; said third connection/disconnection module connects said drive shaft to said third shaft; and said fourth connection/disconnection module disconnects said drive shaft from said first motor shaft.

16. A method for controlling a power output apparatus according to claim 14, wherein when the rotation speed of said drive shaft is in a predetermined high rotation range, said control method controls so as to be a third connection state in which said first connection/disconnection module connects said second motor shaft to said third shaft; said second connection/disconnection module disconnects said second motor shaft from said engine shaft; said third connection/disconnection module disconnects said drive shaft from said third shaft; and said fourth connection/disconnection module connects said drive shaft to said first motor shaft.

* * * * *